United States Patent
Furukawa

[11] Patent Number: 5,767,642
[45] Date of Patent: Jun. 16, 1998

[54] ELECTROMOTIVE POWER STEERING DEVICE

[75] Inventor: Kenji Furukawa, Nagoya, Japan

[73] Assignee: TRW Steering Systems Japan Co. Ltd., Aichi-ken, Japan

[21] Appl. No.: 679,104

[22] Filed: Jul. 12, 1996

[30] Foreign Application Priority Data

Aug. 24, 1995 [JP] Japan .................................. 7-216192

[51] Int. Cl.$^6$ .................... G05B 17/00; B62D 5/04
[52] U.S. Cl. .................... 318/286; 318/689; 318/701; 364/424.046; 364/424.051; 180/404; 180/446
[58] Field of Search .................... 180/404, 446; 364/424.046, 424.051; 318/2, 689, 280, 282, 286, 254, 466, 10, 701

[56] References Cited

U.S. PATENT DOCUMENTS

| | | | |
|---|---|---|---|
| 5,020,618 | 6/1991 | Oshita et al. | 180/142 |
| 5,076,381 | 12/1991 | Daido et al. | 180/79.1 |
| 5,097,918 | 3/1992 | Daido et al. | 180/79.1 |
| 5,182,711 | 1/1993 | Takahashi et al. | 364/424.05 |
| 5,398,953 | 3/1995 | Shimizu | 364/424.05 |

FOREIGN PATENT DOCUMENTS 5238409 9/1993 Japan .
453748 8/1996 Japan .

Primary Examiner—John W. Cabeca
Attorney, Agent, or Firm—Tarolli, Sundheim, Covell, Tummino & Szabo

[57] ABSTRACT

In an electromotive power steering device, when input is received in a reverse direction, i.e., from the road, no assist torque connection is made in the reverse direction. The upper inertial moment is appropriately compensated for. Detection signals from each sensor are received and converted to an input torque, vehicle speed and phase angle. An assist torque command value is calculated from the input torque and the vehicle speed, and an angular velocity and angular acceleration are calculated from the phase angle. Subsequently, the inertial moment of the steering wheel is read and multiplied by the angular acceleration, thereby computing the inertial torque of the steering wheel. It is then determined whether the multiplication of the input torque and the angular velocity results in a positive value or a negative value. Only when the value is positive, correction is made of the assist torque command value. Consequently, no compensation for the upper inertial moment is made against the reverse input from the road. No malfunction arises.

11 Claims, 4 Drawing Sheets

ELECTROMOTIVE POWER STEERING DEVICE

FIELD OF THE INVENTION

This invention relates to an electromotive power steering device.

BACKGROUND OF THE INVENTION

Electromotive power steering devices are prevalent because they have good responsiveness and are generally small, light structures. In such devices, the magnitude of an input torque arising with a torsion bar interconnecting the upper and lower parts of a steering shaft is detected. A command value of an assist torque is determined based on a vehicle speed and the input torque. The command value is transmitted to an electromotive motor that generates the corresponding assist torque which facilitates driving and control of the vehicle.

Recently, an air bag was installed in a car's steering wheel, thereby adding to a load on the steering wheel. The recovery characteristic of such a heavy steering wheel, when released, tends to be worsened. To solve this problem, Japanese laid-open patent application No.5-238409 proposes an electromotive power steering device that compensates for an inertial moment of the upper part of the steering wheel based on the angular velocity of the steering wheel. This is accomplished by adding a sensor to the steering wheel to measure its angular velocity. It is undesirable, however, to provide an additional sensor on the steering wheel, because it adds to the number of components of the steering wheel.

To avoid this disadvantage, Japanese examined and published patent application No. 4-53748 discloses a power steering device in which a steering acceleration is detected from the movement of a racked shaft. However, this disclosure has shortcomings also. Even while the steering wheel is not steered, if there is any disturbance on a road, a racked shaft tends to be moved. Under such conditions, if a correction using the upper inertial moment is made, the inertial moment of the steering wheel acts in a reverse direction.

SUMMARY OF THE INVENTION

Wherefore, an object of the present invention is to provide an electromotive power steering device in which the inertial moment is appropriately compensated for without controlling the steering wheel in a reverse direction, when road disturbances occur.

To attain this and other objects, the present invention provides an electromotive power steering device with a torque detection component for detecting torsion torque arising with a torsion bar of a steering shaft, a vehicle speed detection component for detecting vehicle speed, a command value computation component for computing an assist torque command value based on the torsion torque and the vehicle speed, a steering acceleration detection component for detecting steering acceleration, upper inertial moment information component for providing information regarding the inertial moment of a part of the steering shaft that is above the torsion bar, an upper inertial moment correction value calculation component for calculating a correction value of the upper inertial moment based on the upper inertial moment information and the steering acceleration, and an assist force generation component for determining a drive current from a torque command value that is obtained by adding or subtracting the upper inertial moment correction value to or from the assist torque command value, conducting electricity to a motor drive circuit and generating a steering assist force from the electromotive motor. In the electromotive power steering device, the steering acceleration detection component is provided for estimating the steering acceleration based on the movement of the racked shaft. Furthermore, a reverse input determination component is provided for determining if a reverse input condition exists between a steering velocity and the torsion torque. An upper inertial moment correction cancel component is provided such that no correction using the upper inertial moment correction value is made, when the steering velocity and the torsion torque are in the reverse input condition.

The inertial moment of the steering wheel can be provided as the upper inertial moment information. The steering speed and acceleration can be obtained by multiplying a rotary angular velocity and acceleration of the electromotive motor by a coefficient, or by multiplying a stroke speed and acceleration of the racked shaft by a coefficient. The coefficient can be included in the upper inertial moment information. The steering speed and acceleration themselves do not have to be obtained.

In the electromotive power steering device, when the torsion torque of the torsion bar corresponds to the left steering, and the racked shaft moves toward the right, the inertial moment correction cancel component is operated, thereby making no upper inertial moment correction. Therefore, if the racked shaft moves in response to road disturbances, no assist torque command for assisting the racked shaft movement is outputted.

To the contrary, if the steering wheel is abruptly steered, the direction of the torsion torque coincides with the direction of the movement of the racked shaft. Therefore, the inertial moment correction cancel component is inhibited from operating. The assist torque command value with an appropriate upper inertial moment correction value added thereto is outputted. Therefore, a driver does not feel the steering wheel as being heavy.

As the operation of the steering wheel is stopped, the steering acceleration becomes a negative value. The upper inertial moment correction is made, such that the assist torque is decreased. By giving resistance to the steering wheel, it is prevented from overshooting as the operation of the steering wheel is stopped. Consequently, the recovery characteristic of the steering wheel is enhanced.

When the assist torque command value is defined with the right steering being a positive value and the left steering being a negative value, the upper inertial moment correction value is added for right steering, and is subtracted for left steering, to and from the assist torque command value.

Specifically, the electromotive motor is a stepping motor provided coaxially with the racked shaft, having a rotor functioning as a ball nut and assisting the stroke movement of the racked shaft. The steering acceleration detection component is composed of a phase angle detection means for detecting a phase angle of the stepping motor, a steering speed estimation component for estimating a steering speed based on a variance in the phase angle detected by the phase angle detection means and a steering acceleration estimation component for estimating steering acceleration based on an estimated variance in the steering speed.

The stepping motor is preferably a VR motor and the phase angle detection means is preferably a resolver. A permanent magnet is not used in the VR motor. The VR motor has only little inertial moment and the resolver can attain high resolution. Therefore, the steering acceleration can be estimated as early as possible after the steering wheel is operated.

As aforementioned, in the present invention, the inertial moment of the steering wheel is considered, without causing the undesirable affects associated with the reverse input condition. An operator can comfortably steer the steering wheel without feeling it as being heavy when rapidly steering. In addition, the recovery characteristic of the steering wheel is enhanced.

BRIEF DESCRIPTION OF THE DRAWINGS

The invention will now be described, by way of example, with reference to the drawings, in which.

DETAILED DESCRIPTION OF THE INVENTION

Figure 1:
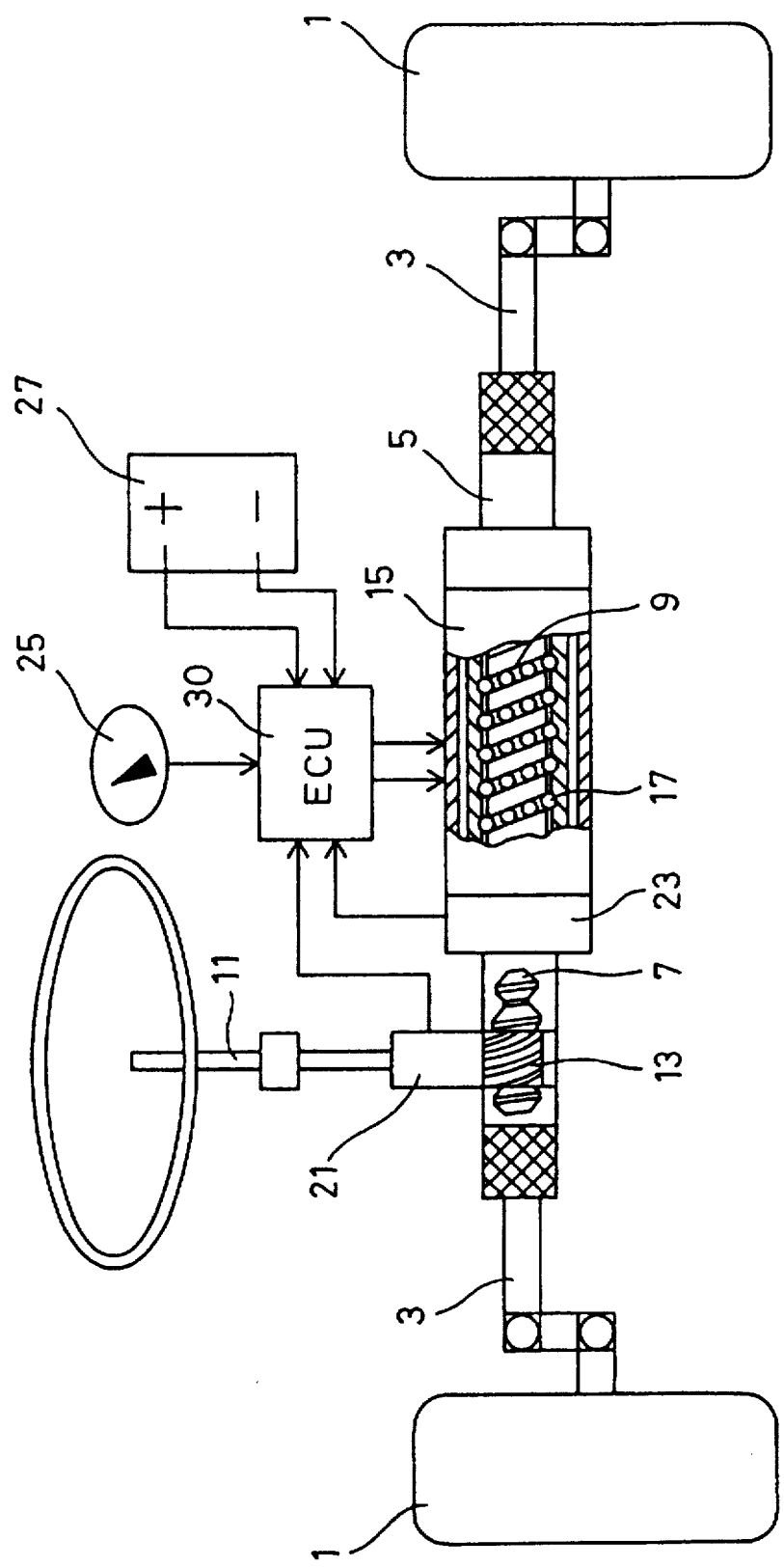
FIG. 1 is a block diagram showing the structure of an electromotive power steering device embodying the invention.

As shown in FIG. 1, in an electromotive power steering device, a racked shaft 5, both ends of which are connected to tires 1 through tie rods 3, respectively, is provided with rack teeth 7 and screw grooves 9. The rack teeth 7 are engaged with a pinion gear 13 provided at the lower end of a steering shaft 11, thereby enabling a manual steering. A stepping motor 15 is mounted coaxially with the racked shaft 5 to enclose the screw grooves 9. Balls 17 are interposed between the screw grooves 9 and the stepping motor 15, thereby forming an assist ball screw.

The stepping motor 15 is driven and controlled with an ECU 30. The ECU 30 receives detection signals from a torque sensor 21 mounted to the steering shaft 11 for detecting the magnitude of input torque, a position sensor 23 for detecting the rotary position of the stepping motor 15 and a vehicle speed sensor 25. An assist torque command value is computed by the ECU 30 based on the detection signals. According to the command value, drive (electrical) power supplied from a battery 27 to the stepping motor 15 is controlled.

An analog signal is transmitted from the torque sensor 21 corresponding to the magnitude of a distortion resulting from the torsion of a torsion bar interconnecting the upper and lower parts of the steering shaft 11. The position sensor 23 is a resolver attached to the stepping motor 15 and transmits wave signals corresponding to the phase angle of the stepping motor 15. The vehicle speed sensor 25 transmits one pulse of signal every time the output shaft of a speed meter cable is rotated once.

Figure 2:
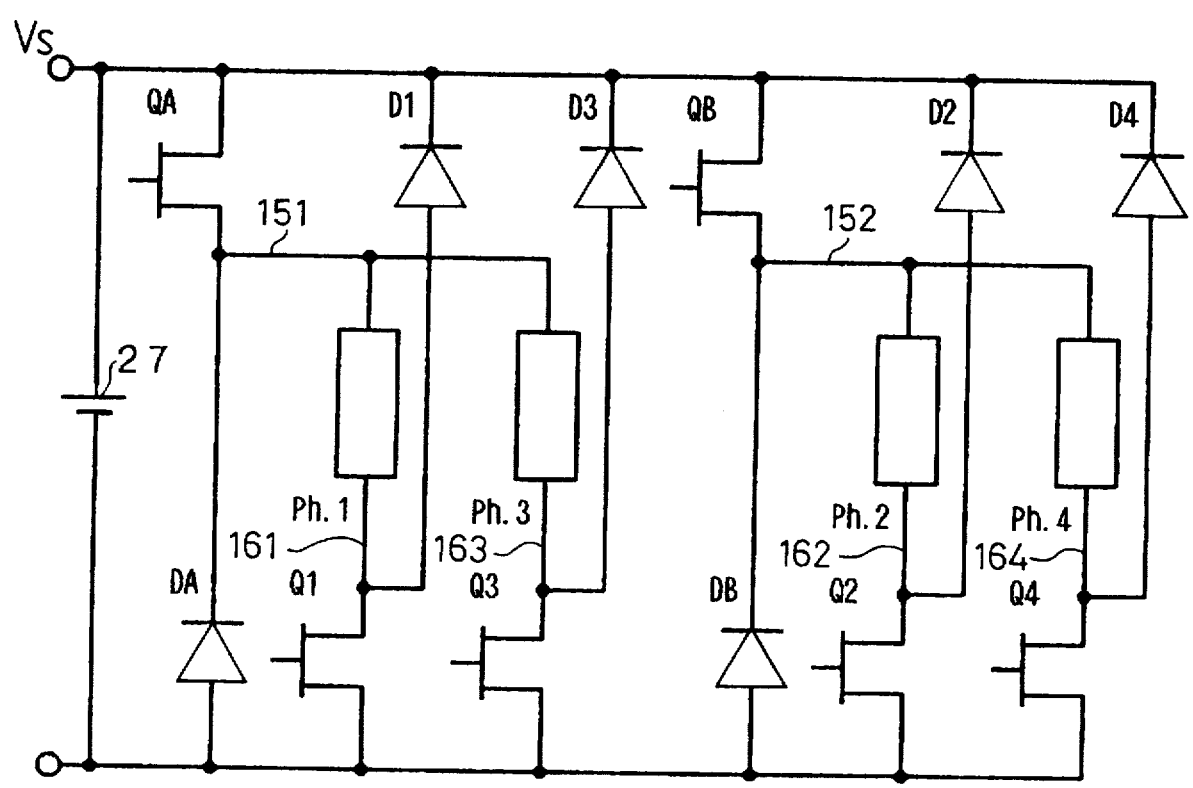
FIG. 2 is a diagram showing a circuit for driving a stepping motor of the embodiment.

The stepping motor 15 is of VR four phase energized type. The drive circuit of the stepping motor 15 is shown in FIG. 2.

The four phase coils of the stepping motor 15 is classified into two groups: first and third phases, Ph.1 and Ph.3; and second and fourth phases, Ph.2 and Ph.4. Each group is connected via common lines 151, 152 to the positive side of the battery 27. MOS FET QA and QB are provided for each group on the common line. The four phase coils Ph1, Ph2, Ph3 and Ph4 are connected via individual lines 161, 162, 163 and 164, respectively, to the negative side of the battery 27, and are provided with MOS FET Q1, Q2, Q3 and Q4 respectively. In the drive circuit, recovery diodes DA, DB, D1, D2, D3 and D4 are disposed.

In the drive circuit, each phase is energized in a predetermined sequence to generate assist force for left and right steering.

Figure 3:
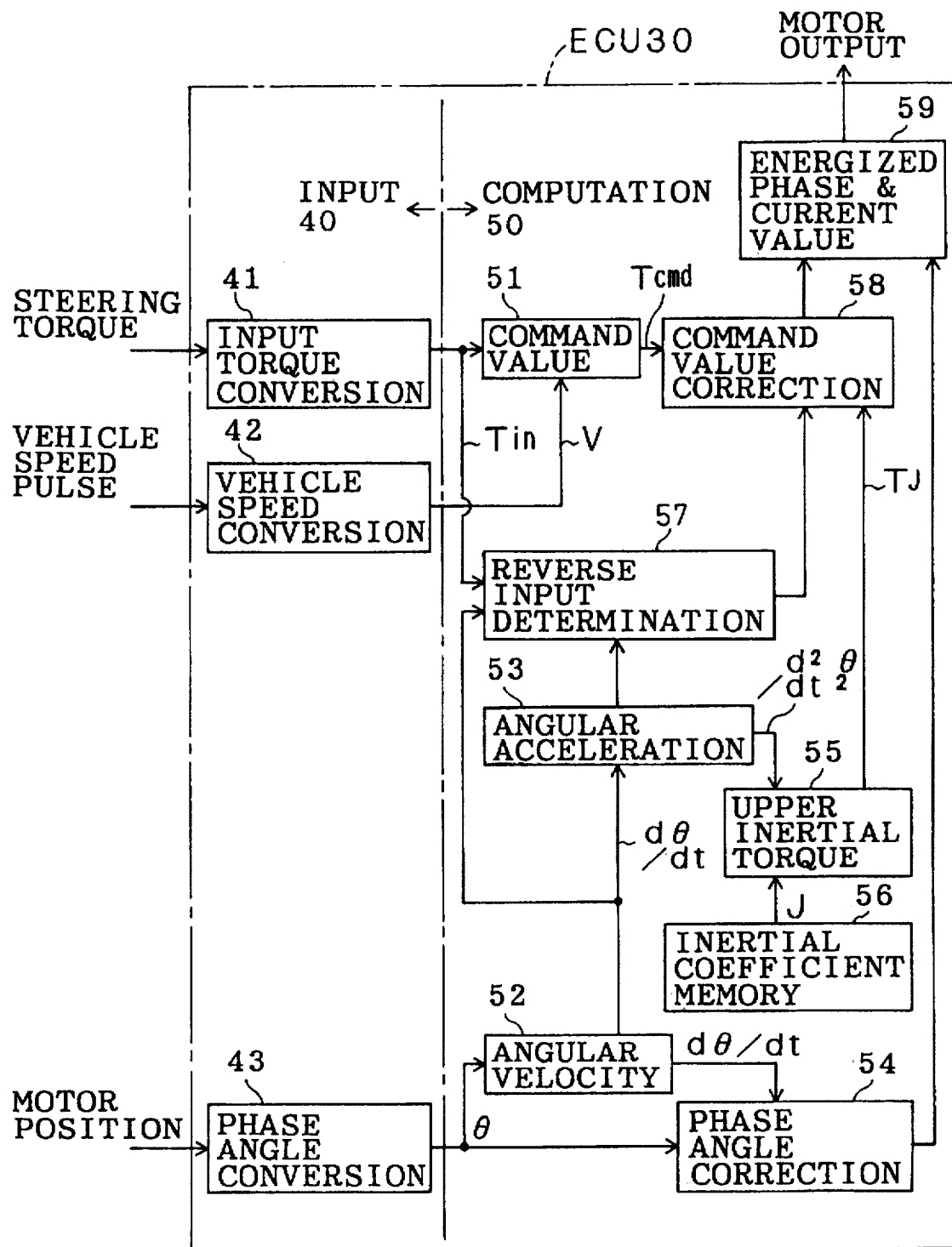
FIG. 3 is a block diagram of an electronic control unit (referred to ECU hereinafter) of the embodiment.

The function of ECU 30 is as shown in the block diagram of FIG. 3.

An input component 40 is composed of an input torque conversion component 41 for converting the detection signal received from the torque sensor 21 to input torque data Tin, a vehicle speed conversion component 42 for converting the vehicle speed pulse signal received from the vehicle speed sensor 25 to vehicle speed data V and a phase angle conversion component 43 for converting the wave signal received from the position sensor 23 to a phase angle $\theta$.

A computation component 50 is composed of: a command value computation component 51 for computing an assist torque command value Tcmd based on the input torque data Tin and the vehicle speed data V; an angular velocity computation component 52 for computing an angular velocity $d\theta/dt$ of the stepping motor 15 based on change in the phase angle $\theta$; an angular acceleration computation component 53 for computing angular acceleration $d^2\theta/dt^2$ based on the rotation angular velocity $d\theta/dt$; a phase angle correction component 54 for correcting the phase angle $\theta$; upper inertial torque computation component 55 for computing the upper inertial torque TJ of the part above the torsion bar based on the angular acceleration $d^2\theta/dt^2$ and a steering wheel inertial moment J; a steering wheel inertial coefficient memory 56 for providing the steering wheel inertial moment J; a reverse input determination component 57 for determining based on the computed angular velocity $d\theta/dt$ and the input torque Tin whether or not it is in the reverse input condition from the road; a command value correction component 58 for correcting the assist torque command value Tcmd based on the upper inertial torque TJ, in consideration of the result determined by the reverse input determination component 57; and an energized phase and current value computation component 59 for calculating a drive current value based on the corrected assist torque command value Tcmd, specifying a steering direction corresponding to the positive or negative sign of the value of the input torque, determining a sequence for energizing phases and designating the phases to be energized based on the corrected phase angle.

The computation executed by the command value computation component 51 is known as conventional. The assist torque command value Tcmd is calculated in proportion to the input torque Tin.

The angular velocity computation component 52 calculates the angular velocity of the stepping motor 15 from the difference between a previously computed phase angle and a presently computed phase angle. The angular acceleration computation component 53 calculates the angular acceleration from the difference between a previously computed angular velocity and the presently computed angular velocity. The phase angle correction par 54 estimates a future change in the phase angle which will occur by the next computation timing, taking into consideration the angular velocity and the presently detected phase angle.

The steering wheel inertial coefficient memory 56 stores the inertial moment J of the steering wheel. For the inertial moment J, the value inherent to a vehicle type is calculated beforehand and stored in the memory 56. The inertial moment J is given by the following formula.

$$J = \Sigma\, mr^2 \tag{1}$$

In this formula, m is the weight of the small part of the steering wheel and r is the distance between the center and the small part of the steering wheel.

Based on the following formula, the upper inertial torque TJ is computed by the upper inertial torque computation component 55.

$$TJ = K \cdot d^2\theta/dt^2 \cdot J \quad (2)$$

In this formula, K is a coefficient for conversion.

The upper inertial torque TJ becomes positive or negative depending on the value of $d^2\theta/dt^2$. When the steering wheel begins to be steered, the acceleration becomes a positive value. Therefore, the upper inertial torque TJ is also a positive value. When the steering of the steering wheel ends, the acceleration is a negative value and the upper inertial torque TJ thus becomes negative.

The reverse input determination component 57 determines based on the relationship in positive or negative sign of the value between angular velocity $d\theta/dt$ and input torque Tin, whether or not the input is in the reverse condition from the road. For example, the values of angular velocity $d\theta/dt$ and input torque Tin are predetermined to be positive for right steering and negative for left steering. The reverse input determination component 57 determines that the input is not in the reverse condition when the positive or negative sign of the value of angular velocity $d\theta/dt$ coincides with that of the input torque Tin, and determines that the input is in the reverse condition when the positive or negative signs of these values do not coincide with each other.

The command value correction component 58 corrects the assist torque command value Tcmd based on the following formula.

Right steering: Tcmd <— Tcmd+TJ (3)

Left steering: Tcmd <— Tcmd−TJ (4)

In this embodiment, the assist torque command value Tcmd for right steering is positive and that for left steering is negative.

As aforementioned, the upper inertial torque TJ is a positive value when the angular velocity of the steering wheel is increased and is a negative value when the angular velocity of the steering wheel is decreased. Therefore, when the steering wheel begins to be steered, the absolute value of the assist torque command value Tcmd is increased, and when the steering of the steering wheel ends, the absolute value is decreased.

Figure 4:
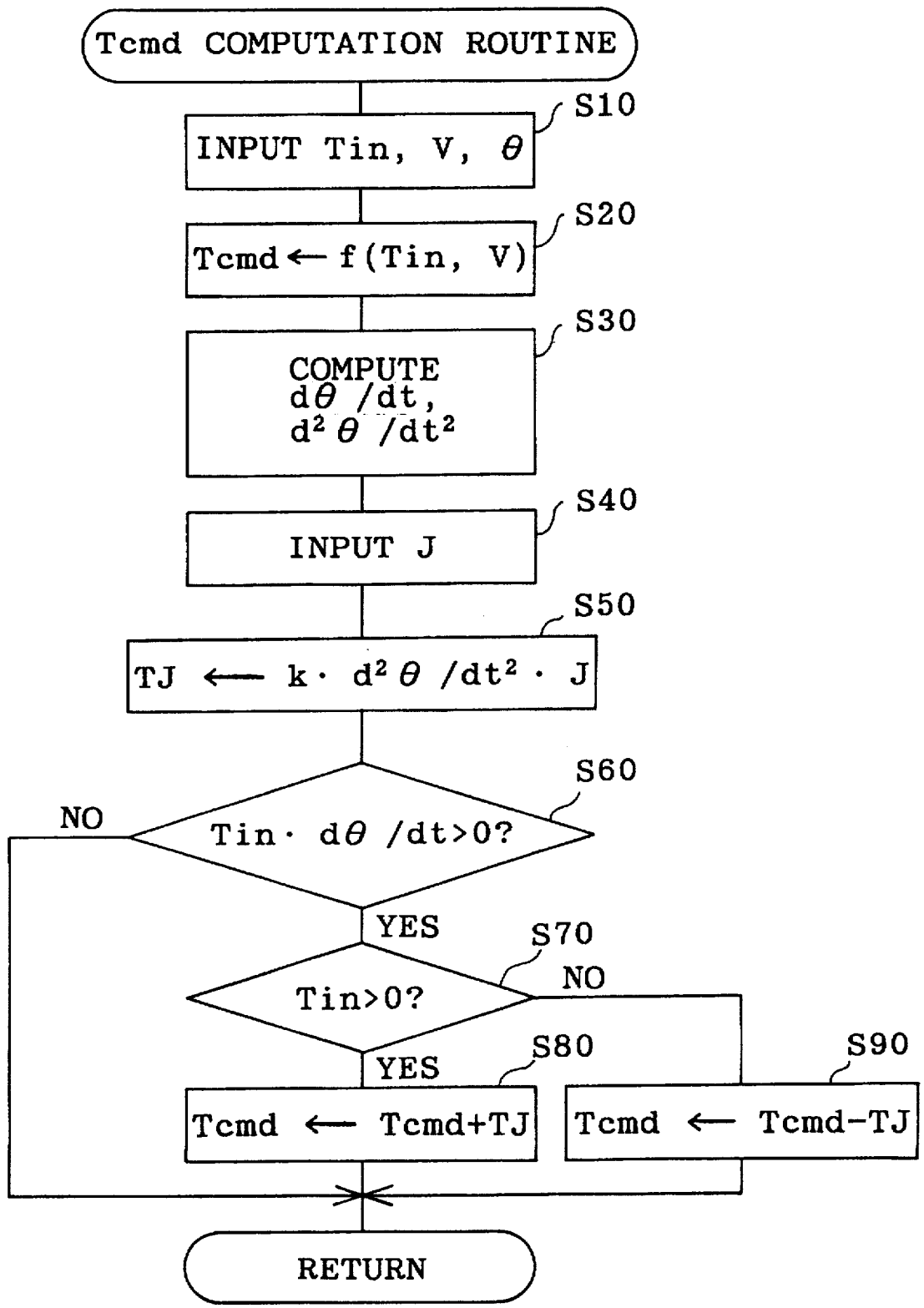
FIG. 4 is a flowchart of a computation process of the embodiment.

The algorithm of the computation is explained referring now to the flowchart of FIG. 4.

First at step S10 the input torque Tin, vehicle speed V and phase angle θ are transmitted from the input component 40 to the computation component 50. At step S20, the assist torque command value Tcmd is computed from input torque Tin and vehicle speed V. Also, the angular velocity $d\theta/dt$ and the angular acceleration $d^2\theta/dt^2$ are computed from the phase angle θ at step S30. Subsequently, at step S40 the inertial moment J of the steering wheel is read, and at step S50 the inertial torque TJ of the steering wheel is computed using formula(2).

Subsequently, at step S60 it is determined whether the value of the result of the multiplication of input torque Tin and angular velocity $d\theta/dt$ is negative or positive. If the multiplication value is determined positive, it is determined at step S70 whether or not the value of input torque Tin is positive or negative. If the value of Tin is positive, at step S80 the assist torque command value Tcmd is corrected using formula(3). If the value of Tin is negative or zero, at step S90 the assist torque command value Tcmd is corrected using formula(4). If it is determined at step S60 that the value obtained by the multiplication of input torque Tin and angular velocity $d\theta/dt$ is not positive, no correction is made. When the calculation result at step S60 or S70 is zero, no correction is made.

As aforementioned, no malfunction arises against the reverse input from the road. When the steering starts, the assist torque is increased in a direction so that the driver feels that the steering wheel is not heavy. When the steering ends, appropriate weight is added to the steering wheel, thereby decreasing the assist torque and avoiding excess steering. Therefore, if the weight of the steering wheel is increased like in a vehicle provided with the air bag, comfort steering assisted by power can be realized, without impairing the feel by the driver.

Also in the present invention, the steering acceleration can be estimated using a resolver originally provided for controlling the stepping motor, thereby obviating the necessity of a speed sensor or an acceleration sensor to be mounted to the steering wheel. Without increasing the number of components, the aforementioned effectiveness can be obtained.

This invention has been described above with reference to the preferred embodiment as shown in the figures. Modifications and alterations may become apparent to one skilled in the art upon reading and understanding the specification. Despite the use of the embodiment for illustration purposes, the invention is intended to include all such modifications and alterations within the spirit and scope of the appended claims.

What is claimed is:

1. An electromotive power steering device for providing an appropriate drive current to an electromotive motor which generates a steering assist force for a vehicle having a racked shaft and a steering system connected to a torsion bar in which the drive current is based on an assist torque command value, a corrected inertial moment value, and a reverse input condition, comprising:

a torque detection component for detecting torsion torque arising in the torsion bar;

a vehicle speed detection component for detecting vehicle speed;

a command value computation component being coupled to the torque detection component and the vehicle speed detection component for computing the assist torque command value based on the torsion torque and the vehicle speed;

a steering acceleration estimation component for estimating steering velocity and steering acceleration based on movement of the racked shaft;

an inertial moment information component for providing an inertial moment of the steering system;

a corrected inertial moment value computation component being coupled to the steering acceleration estimation component and the inertial moment information component for computing the corrected inertial moment value based on the steering acceleration and the inertial moment;

a reverse input determination component being coupled to the torque detection component and the steering acceleration estimation component for determining if the reverse input condition exists between the torsion torque and the steering velocity;

a corrected inertial moment value cancel component being coupled to the reverse input determination component for canceling the corrected inertial moment value when the reverse input condition exists; and an assist force generation component being coupled to the command value computation component, the corrected inertial moment value computation component, and the corrected inertial moment value cancel component for computing the steering assist force and supplying the appropriate drive current to the electromotive motor such that the steering assist force is generated, wherein the steering assist force is based on the assist torque command value and the corrected inertial moment value.

2. An electromotive power steering device as claimed in claim 1, wherein the electromotive motor is a stepping motor provided coaxially with the racked shaft, and provided with a rotor functioning as a ball nut that assists with movement of the racked shaft.

3. An electromotive power steering device as claimed in claim 2, in which the steering acceleration estimation component further comprises:

a phase angle detection means being coupled to the stepping motor for detecting a phase angle of the stepping motor, wherein the steering velocity is estimated based on an angle variance in the phase angle, and the steering acceleration is estimated based on a velocity variance in the steering velocity.

4. An electromotive power steering device as claimed in claim 3, wherein the stepping motor is a VR motor and the phase angle detection means is a resolver.

5. An electromotive power steering device as claimed in claim 4, wherein the angle variance is a positive value for a right turn of the vehicle and a negative value for a left turn of the vehicle, and the torsion torque is a positive value for a right turn of the vehicle and a negative value for a left turn of the vehicle.

6. An electromotive power steering device as claimed in claim 5, wherein the reverse input determination component determines that the reverse condition exists when a product of the angle variance and the torsion torque is a negative value.

7. An electromotive power steering device as claimed in claim 6, wherein the steering assist force is defined by the assist torque command value plus the corrected inertial moment value when the torsion torque is greater than 0, and the assist torque command value minus the corrected inertial moment value when the torsion torque is not greater than 0.

8. An electromotive power steering device for providing an appropriate drive current to an electromotive motor which generates a steering assist force for a vehicle having a steering system connected to a torsion bar in which the drive current is based on an assist torque command value, a corrected inertial moment value, and a reverse input condition, comprising:

a torque detection component for detecting torsion torque arising in the torsion bar;

a vehicle speed detection component for detecting vehicle speed;

a command value computation component being coupled to the torque detection component and the vehicle speed detection component for computing the assist torque command value based on the torsion torque and the vehicle speed;

a steering acceleration detection component for detecting steering acceleration;

an inertial moment information component for providing an inertial moment of the steering system;

a corrected inertial moment value computation component being coupled to the steering acceleration detection component and the inertial moment information component for computing the corrected inertial moment value based on the steering acceleration and the inertial moment;

a steering velocity detection component for detecting steering velocity;

a reverse input determination component being coupled to the torque detection component and the steering velocity detection component for determining if the reverse input condition exists between the torsion torque and the steering velocity;

a corrected inertial moment value cancel component being coupled to the reverse input determination component for canceling the corrected inertial moment value when the reverse input condition exists; and an assist force generation component being coupled to the command value computation component, the corrected inertial moment value computation component, and the corrected inertial moment value cancel component for computing the steering assist force and supplying the appropriate drive current to the electromotive motor such that the steering assist force is generated, wherein the steering assist force is based on the assist torque command value and the corrected inertial moment value.

9. A method of providing an appropriate drive current to an electromotive motor which generates a steering assist force for a vehicle having a steering system connected to a torsion bar in which the drive current is based on an assist torque command value, a corrected inertial moment value, and a reverse input condition, said method comprising the steps of:

measuring torsion torque in the torsion bar;

measuring vehicle speed;

computing the assist torque command value based on the torsion torque and the vehicle speed;

detecting steering acceleration;

providing an inertial moment of the steering system;

computing the corrected inertial moment value of the steering system based on the steering acceleration and the inertial moment;

detecting steering velocity;

determining whether or not the steering velocity and the torsion torque are in the reverse input condition;

canceling the corrected inertial moment value if the reverse input condition exists;

computing the steering assist force based on the assist torque command value and the corrected inertial moment value; and supplying the appropriate drive current to the electromotive motor such that it generates the steering assist force.

10. A method as claimed in claim 9, wherein the step of determining whether or not the steering velocity and the torsion torque are in the reverse input condition further comprises the step of:

multiplying the torsion torque and the angular velocity, said torsion torque and said angular velocity being positive for a right steering of the vehicle and negative for a left steering of the vehicle, wherein the reverse input condition exists when the multiplication yields a negative value.

11. A method as claimed in claim 10, wherein the step of computing the steering assist force further comprises the steps of:

adding the corrected inertial torque to the assist torque command value when the torsion torque is positive; and subtracting the corrected inertial torque from the assist torque command value when the torsion torque is negative.

* * * * *